Oct. 6, 1964     D. K. DICKEY ETAL     3,151,575
RAILWAY VEHICLE SUSPENSION
Filed Jan. 11, 1961     4 Sheets-Sheet 1
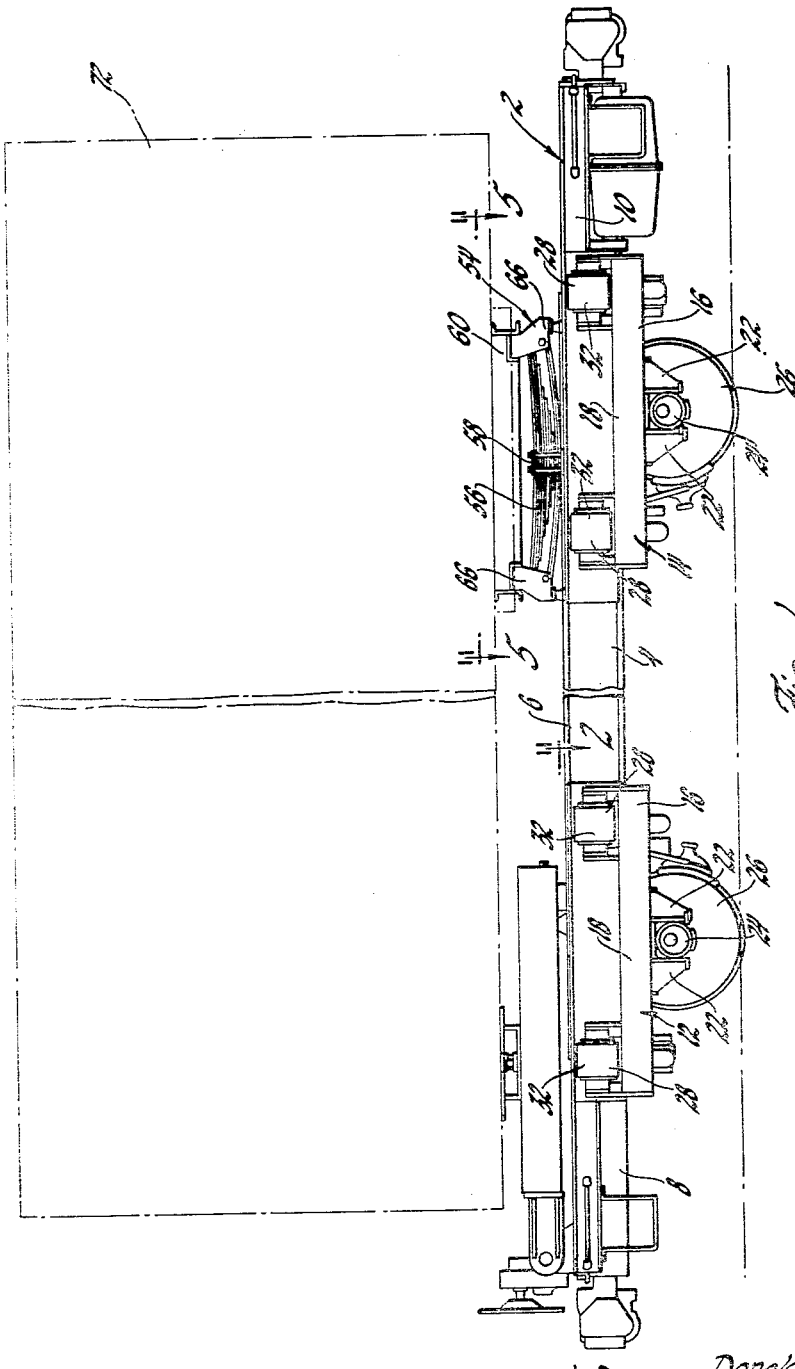
INVENTORS
Donald K. Dickey, &
Gerald Smith
BY
J. L. Carpenter
ATTORNEY Oct. 6, 1964
D. K. DICKEY ETAL
3,151,575
RAILWAY VEHICLE SUSPENSION
Filed Jan. 11, 1961
4 Sheets-Sheet 2
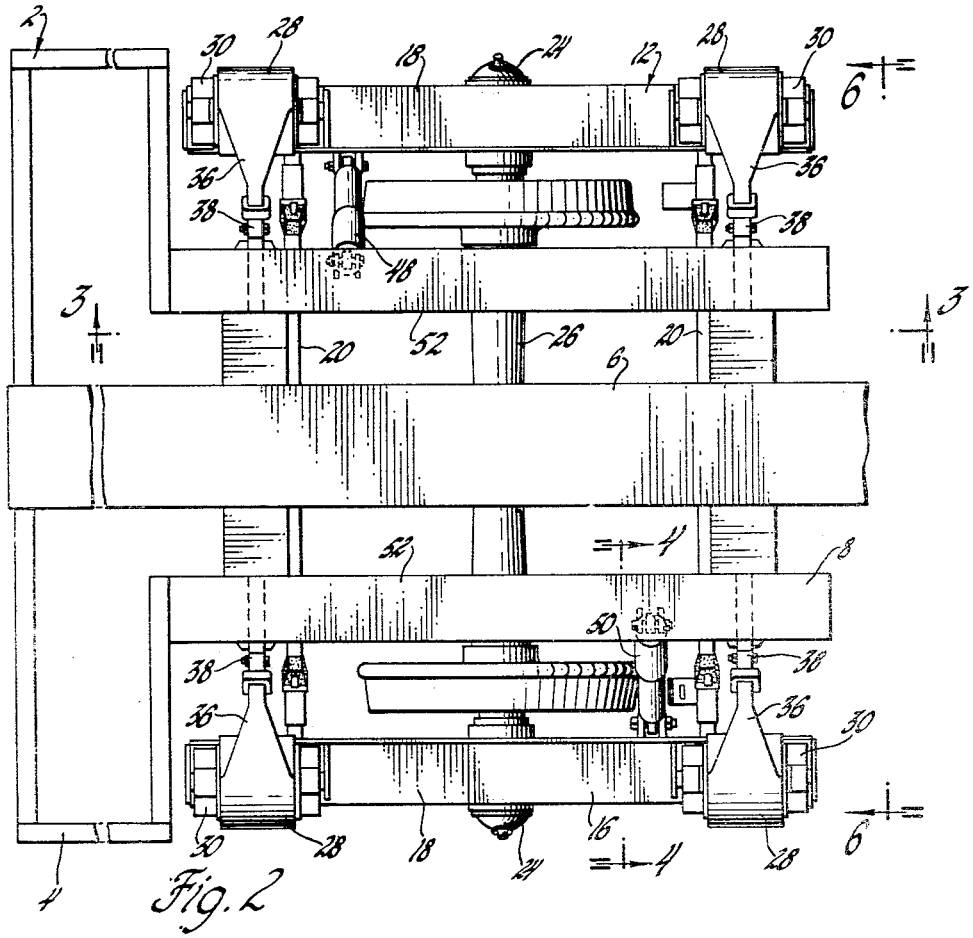
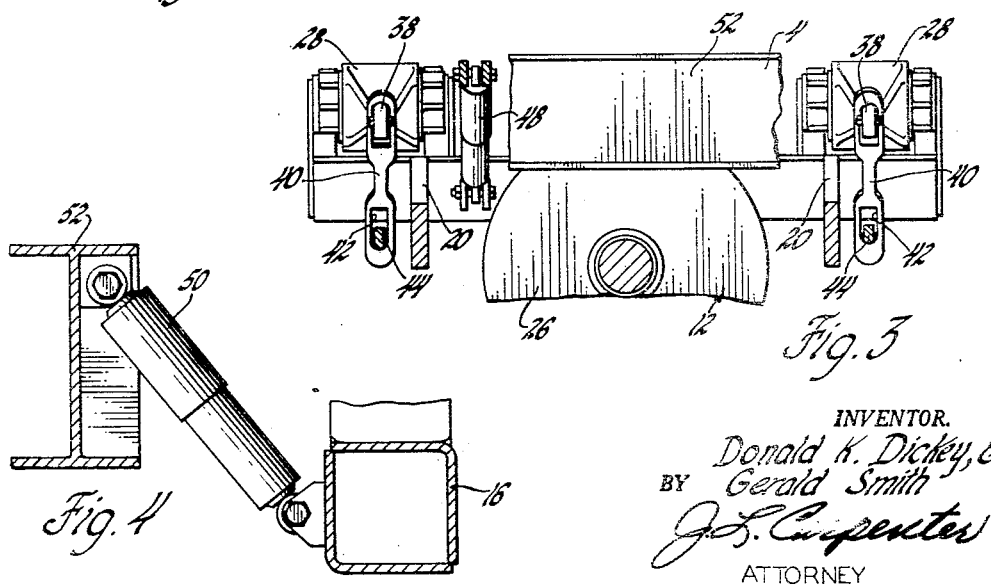
INVENTOR.
Donald K. Dickey, &
BY Gerald Smith
ATTORNEY

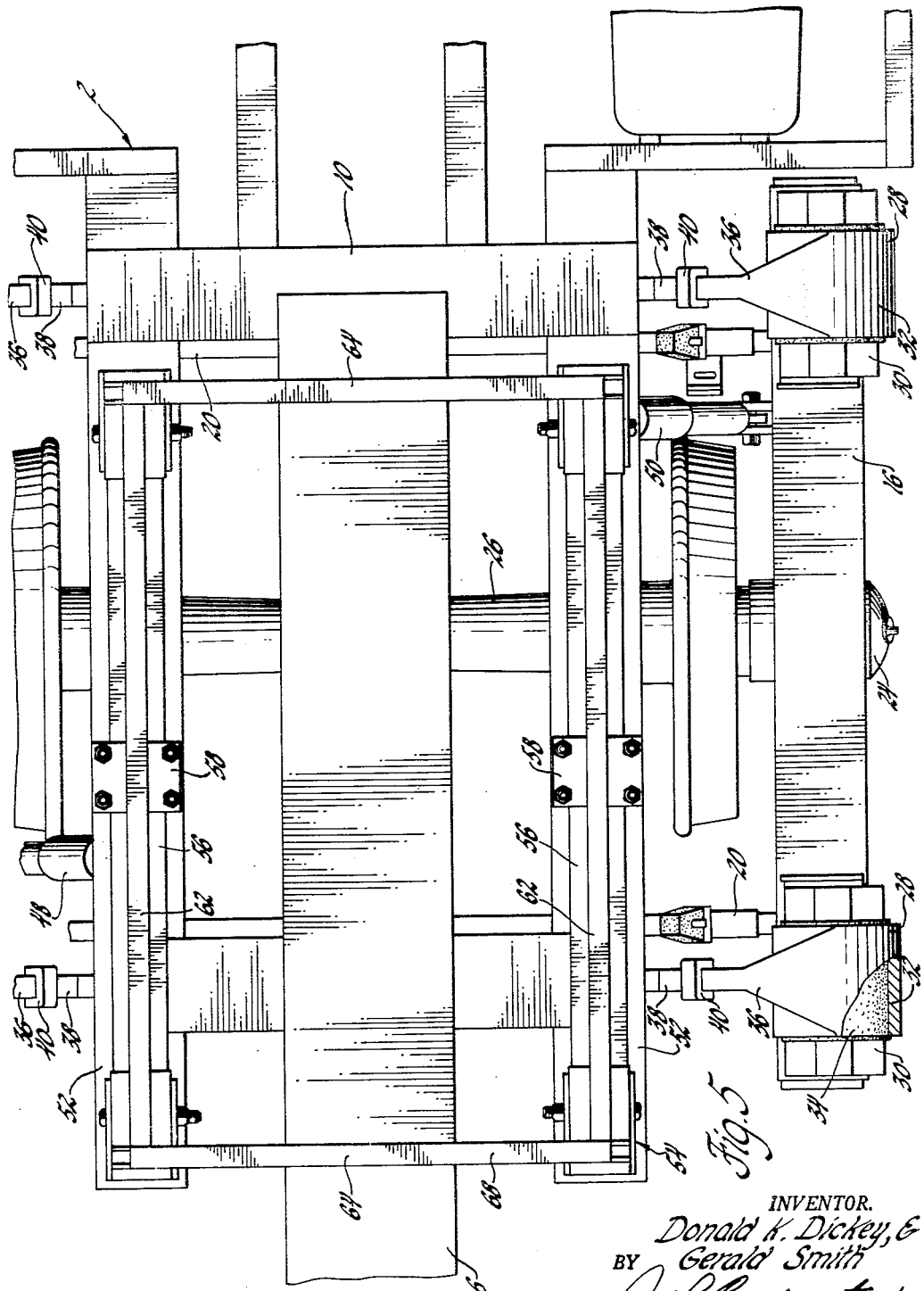

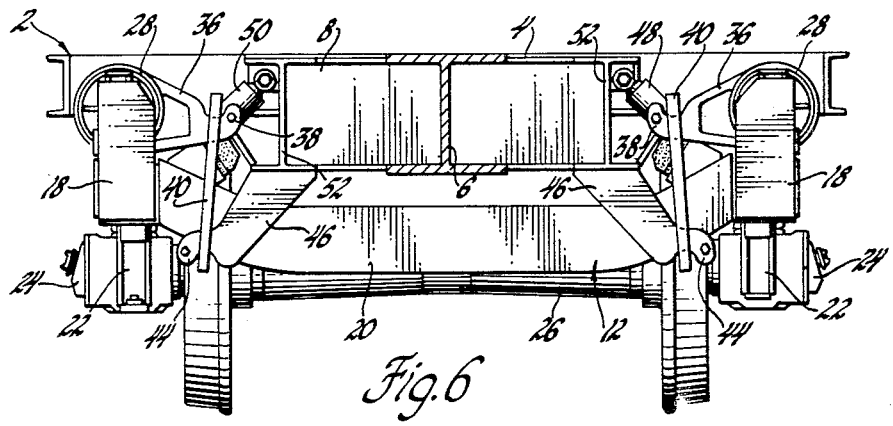

United States Patent Office 3,151,575
Patented Oct. 6, 1964

3,151,575
RAILWAY VEHICLE SUSPENSION
Donald K. Dickey and Gerald Smith, London, Ontario, Canada, assignors to General Motors Corporation, Detroit, Mich., a corporation of Delaware
Filed Jan. 11, 1961, Ser. No. 82,120
4 Claims. (Cl. 105—453)

This invention relates generally to railway vehicles adapted to accommodate and transport highway semi-trailers either with or without their wheel and axle set removed and more specifically to the suspensions for such vehicles.

It is essential that the suspension of the railway vehicle for transporting semi-trailers when used in conjunction with the suspension of the semi-trailer when it is accommodated on the vehicle be sufficiently shock absorbing and cushioning to properly protect the lading in the semi-trailer van against damage. Yet, the suspension must be relatively simple both to assemble and maintain in order to make highway semi-trailer transportation by rail economically feasible.

The railway vehicle suspension which forms the subject of the present invention it is believed meets the requirements set forth above and does so in a unique and unusual way especially when the railway car is adapted to accommodate semi-trailers whose rear wheel and axle set has been removed before being transported thereon.

It is then broadly an object of this invention to provide a novel truck suspension for the ends of a railway vehicle.

It is a further object of the invention to provide a suspension at one end of such vehicles which is particularly adapted to flexibly support and cushion one end of a highway semi-trailer.

It is another object of the invention to provide a special composite suspension assembly for one end of a railway vehicle particularly adapted to accommodate the wheeled end of a highway semi-trailer with its wheel and axle set removed.

It is another object of the invention to provide a secondary suspension on the vehicle which supplements the vehicle truck suspension at one end thereof.

It is a still further object to provide a single axle truck suspension which includes a rectangular truck frame on which the vehicle end is flexibly hung on the four corners thereof.

For a fuller understanding of the above and further objects of the invention, reference may be made to the following detailed description taken in conjunction with the drawings in which:

FIGURE 1 is a side view in elevation of a railway vehicle including the novel suspension thereof with a semi-trailer shown supported thereon with its wheel and axle set removed.

FIGURE 2 is an enlarged view in plan of one end of the railway vehicle taken substantially on the line 2—2 of FIGURE 1 further illustrating certain details of the novel truck suspension.

FIGURE 3 is a side view in elevation taken substantially on the line 3—3 of FIGURE 2 with parts broken away and in section illustrating in particular the rubber bushed torsion structures and hangers which suspend the end of the vehicle on the truck frame.

FIGURE 4 is a view taken substantially on the line 4—4 of FIGURE 2 illustrating one of the shock absorbing details and its manner of connection between the vehicle underframe and truck frame.

FIGURE 5 is a view in plan, taken substantially on the line 5—5 of FIGURE 1, of the opposite end of the vehicle showing certain of the details of the secondary suspension superimposed on the opposite vehicle end.

FIGURE 6 is an end view taken substantially on the line 6—6 of FIGURE 2 with parts broken away and in section further illustrating the details of the primary suspension.

FIGURE 7 is a side view of the opposite end of the railway vehicle with parts broken away showing the leaf spring detail of the secondary suspension.

FIGURE 8 is a view taken substantially on the line 8—8 of FIGURE 7 illustrating one of the connections between the ends of the spring and the frame supported thereby as well as one of the snubbing means acting between the top of the vehicle underframe and a corner of the secondary frame supported by the leaf springs.

Referring first to FIGURE 1, a railway vehicle has been indicated generally by a numeral 2. The vehicle 2 includes an underframe 4 which is made up of a longitudinally extending center sill 6 and a pair of platform ends 8 and 10 made up of structural members welded to the sill 6. The end 8 is supported by a truck assembly 12 whereas end 10 is supported by a similar truck assembly 14. These truck assemblies in conjunction with certain details of the underframe 4 constitute one of the very important features of this invention.

Referring now to FIGURES 2, 3, 4 and 6, it will be observed that the truck assemblies 12 and 14 each include a rectangular truck frame 16 made up of a pair of oppositely longitudinally extending members 18 and a pair of longitudinally spaced transversely extending strength members 20 which are welded or otherwise secured at their ends to the members 18.

Downwardly depending from each side frame member 18 are a pair of pedestals 22 which receive a journal box 24 therebetween, each box 24 journaling an end of a wheel and axle set 26 intermediate the ends of the members 18.

Mounted on each corner of both truck frames 16 are torsion spring structures each indicated by a numeral 28. These torsion spring structures are all the same and comprise an inner cylindrical-like member 30 and an outer sleeve 32 between which is bonded a rubber bushing or sleeve of other resilient material 34. The outer bushing or sleeve 32 has formed thereon an arm 36. Since each of the members 30 is rigidly fixed to the ends of the longitudinally extending members 18, any load placed on the ends of the arms 36 will tend to shear the rubber bushings 34 and thus a resilient support at each of the truck frame corners has been provided. The torsion spring structures 28 are more or less of conventional or standard construction and no further description is believed necessary with respect to them since per se they do not form the subject of the present invention. It will be noted that the arms 36 all extend transversely inwardly substantially horizontally. Each arm 36 is provided with a hooked end 38 from which is hung a link 40. The links 40 in turn each have extending through an eye 42 in the lower end thereof a hooked end 44 which is formed on eight downwardly depending members 46 which are rigidly secured to the underframe 4 of the vehicle. The links 40, it will be noted, flare slightly outwardly and downwardly tending to increase the lateral stability of the underframe as it is supported on the torsional structures 28 mounted on trucks 12 and 14.

To damp both lateral and vertical movement of the underframe relative to the truck frames of trucks 12 and 14, pairs of shock absorbing assemblies 48 and 50 have been provided which are diagonally located relative to the longitudinal center line of the vehicle end and which extend inwardly and diagonally upwardly from the truck side frame members 18 to a pair of longitudinally extending members 52 forming part of the ends 8 and 10 of the underframe 4.

It is important to note that the truck assemblies 12 and 14 each include but a single-wheeled axle which, however, is completely stabilized by the manner in which the respective underframe ends 8 and 10 are hung thereon and that the ends 8 and 10 are cushioned at four corners by the torsion spring structures 28. The shock absorbers 48 and 50 primarily serve to damp the longitudinal and lateral movement of the truck assembly relative to the vehicle end.

It will be further noted that, if the centers of the vehicle end and the truck assembly are displaced transversely relative to each other, there will be gravitational forces applied tending to re-center the vehicle end. These centering forces may be varied by varying either the length of links 40, the lengths of the arms 36 or members 46 or the angle at which the links 40 hang, or by variations in any combination of these last listed items.

It has been found that in the carrying of semi-trailers, especially with their bogies or wheel and axle sets removed, certain cargoes may require further cushioning in order to protect them from damage. Such a supplementary suspension has been provided in the present invention.

It will be observed from FIGURES 1, 5 and 7 that the end 10 is provided with a secondary suspension indicated generally by a numeral 54. The secondary suspension 54 comprises two oppositely disposed longitudinally extending leaf spring sets 56 each secured at the top of the underframe end 10 by fastening assemblies 58. These leaf springs 56 (see particularly FIGURE 7) support opposite sides of a secondary rectangular frame 60 which is made up of a pair of transversely disposed longitudinally extending channels 62 and a pair of longitudinally spaced transversely extending channels 64 welded together at their ends.

At each corner of frame 60 there is provided a bracket 66. Each of brackets 66 has secured thereto by studs 68 the ends of certain of the leaves making up the leaf spring sets 56. The remaining leaf spring ends directly support the corners of the frame 60.

Secured to the upper side of the underframe end 10 directly below each bracket 66 is a rubber bumper 70. These bumpers serve to limit the movement of the secondary suspension relative to the upper side of the underframe end 10 by offering rapidly increasing resistance to downward movement of brackets 66.

Referring now to FIGURE 1, it will be observed that a semi-trailer van 72 is shown in phantom with its bogie removed. The kingpin end of the vehicle is supported by certain means at the front end 8 of the vehicle. The rear end is provided with a downwardly open channel which embraces the outer sides of the frame 60. Thus, the secondary suspension 54 acts as a substitute for the semi-trailer bogie except that because of the special configuration thereof and the manner in which it is snubbed at the corners thereof, substantially improves the cushioning of the bogie end of the semi-trailer on the railway vehicle.

We claim:

1. In combination with a railway vehicle, a single axle suspension for one end thereof comprising a body frame, a generally rectangularly shaped truck frame, a single transversely extending axle having wheels on opposite ends thereof supporting said truck frame intermediate the ends thereof, a plurality of torsion spring structures mounted on one of said frames in a generally rectangular arrangement and substantially in vertical alignment with the corners of said truck frame, a set of laterally inwardly extending arms, a set of laterally outwardly extending arms, one set of said arms being mounted on said torsion spring structures and the other set of said arms being mounted on the frame on which said torsion spring structures are not mounted, and links connecting associated inwardly and outwardly extending arms to thereby swingingly suspend said body frame on said truck frame at rectangularly spaced locations on opposite sides of the longitudinal and transverse center lines of said truck frame to thereby stabilize said truck frame against turning movement about said single axle while at the same time allowing for lateral movement thereof relative to said body frame.

2. The structural combination claimed in claim 1, which further includes a pair of shock absorbing assemblies disposed on opposite sides of the longitudinal center line of said truck frame, each said assembly being secured between said body frame and said truck frame to damp movement therebetween.

3. The structural combination claimed in claim 1, which further includes a pair of laterally spaced longitudinally extending leaf spring sets secured at the centers thereof to the upper side of said body frame, and a rectangular supporting frame having the corners thereof mounted on the ends of said springs and supported thereby.

4. The structural combination claimed in claim 3, which further includes snubbing means between the corners of said supporting frame and the upper side of said body frame to stabilize said supporting frame on said body frame.

References Cited in the file of this patent

UNITED STATES PATENTS

| | | |
|---|---|---|
| 805,105 | Timmis | Nov. 21, 1905 |
| 811,622 | Downer | Feb. 6, 1906 |
| 2,154,919 | Shafer | Apr. 18, 1939 |
| 2,208,627 | Breer | July 23, 1940 |
| 2,630,079 | Cottrell | Mar. 3, 1953 |
| 2,694,368 | Gouirand | Nov. 16, 1954 |
| 2,730,048 | Coskun | Jan. 10, 1956 |
| 2,907,283 | Markestein et al. | Oct. 6, 1959 |
| 2,917,006 | Lich | Dec. 15, 1959 |
| 2,958,297 | Broberg | Nov. 1, 1960 |